(12) United States Patent
Zhu et al.

(10) Patent No.: US 9,532,196 B2
(45) Date of Patent: Dec. 27, 2016

(54) METHOD FOR IMPLEMENTING UNSTRUCTURED SUPPLEMENTARY SERVICE DATA SERVICE

(75) Inventors: Zhongliang Zhu, Shenzhen (CN); Zhijun Zhou, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 1105 days.

(21) Appl. No.: 13/125,031

(22) PCT Filed: Sep. 8, 2009

(86) PCT No.: PCT/CN2009/073812
§ 371 (c)(1),
(2), (4) Date: Apr. 19, 2011

(87) PCT Pub. No.: WO2010/045829
PCT Pub. Date: Apr. 29, 2010

(65) Prior Publication Data
US 2011/0310985 A1  Dec. 22, 2011

(30) Foreign Application Priority Data
Oct. 20, 2008  (CN) .......................... 2008 1 01673291

(51) Int. Cl.
*H04L 27/00* (2006.01)
*H04W 4/14* (2009.01)

(52) U.S. Cl.
CPC ...................................... *H04W 4/14* (2013.01)

(58) Field of Classification Search
CPC .................................. H04W 4/14; H04W 4/16
USPC ..... 455/404.2, 414.1, 415, 445, 456.1, 456.2
See application file for complete search history.

(56) References Cited

U.S. PATENT DOCUMENTS

2005/0164713 A1* 7/2005 Tang-Taye ................. 455/456.2
2008/0132259 A1* 6/2008 Vin ............................... 455/466

FOREIGN PATENT DOCUMENTS

| CN | 1592430 | 3/2005 |
|---|---|---|
| CN | 101197879 | 6/2008 |
| CN | 101384004 | 3/2009 |

* cited by examiner

*Primary Examiner* — Sam Bhattacharya
(74) *Attorney, Agent, or Firm* — Bright IP Law Offices

(57) ABSTRACT

The present invention provides a method for implementing an Unstructured Supplementary Service Data service, defining an access code and its corresponding menu or function, and menu or function corresponding to each response under each level of menu, the menu including menu content for prompting users, the method comprising: a user inputs a Unstructured Supplementary Service Data (USSD) character string to the Unstructured Supplementary Service Data Center (USSDC) at the system side; the USSDC processes the USSD character string and obtains an access code, if the access code corresponds to a menu, the USSDC returns menu content of the menu to the user, the user receives the menu content, or receives the menu content and interacts, according to the menu content, with the USSDC. By applying the method for implementing the USSD service of the present invention, a user can enter corresponding function flow by inputting information step by step according to menu prompts, which enables convenient use of the user.

15 Claims, 6 Drawing Sheets

| sercode | sertype | serid |
|---|---|---|
| access code | type of the access code<br>1menu, 2func | indexes corresponding to the type fields, respectively corresponding to<br>Menuindex, funcid |
| 780 | 1(menu) | 2(Call center) |
| 781 | 2(func) | 2(query balance) |

(a) USSD service code table

| menuid | content1 | content2 | menumode | description |
|---|---|---|---|---|
| menu index | English content string | local language content string | menu type<br>0 request type<br>1 notification type | description |
| 1 | product info press 1.<br>query balance press 2. | 产品信息请按1,<br>查询余额请按2。 | 0 | menu1 |
| 2 | Call center | 呼叫中心 | 1 | menu2 |

(b) menu information table

| Menuid | keynum | sertype | serid |
|---|---|---|---|
| menu index | Key.<br>a notification type menu having no response key. | type of operation<br>1menu,<br>2func | indexes corresponding to the type fields, respectively corresponding to<br>menuindex<br>funcid |
| 1 | 1 | 1(menu) | 2(Call center) |
| 1 | 2 | 2(func) | 2(query balance) |

(c) menu response table

Fig. 4

METHOD FOR IMPLEMENTING UNSTRUCTURED SUPPLEMENTARY SERVICE DATA SERVICE

FIELD OF THE INVENTION

The present invention relates to the telecommunication field, in particular to a method for implementing a USSD (Unstructured Supplementary Service Data) service under an OCS (Online Charging System) in a GSM (Global System for Mobile Communication) mobile intelligent network.

BACKGROUND OF THE INVENTION

At present, the USSD service under the OCS provides for users a series of single services such as query balance, recharge, and account transfer, etc. The specific implementation process is: after a user inputs a USSD instruction, an HLR (Home Location Register) sends the instruction to a USSDC (Unstructured Supplementary Service Data Center), the USSDC converts the instruction into an MML (Man-Machine Language) command and sends it to the OCS, the OCS returns the result in the form of the MML command to the USSDC, and the USSDC converts the MML command into a USSD string and sends the converted USSD string to the user. A user only has one choice if he wants to use a certain function, which is remembering the USSD access code providing the function and the instruction format. A signaling flowchart of a user inputting a USSD instruction to directly enter a function flow is shown in FIG. 1, which includes the following procedures.

Step 110, when a user dials a USSD access code, an MSC (Mobile Switch Center)/HLR (Home Location Register) sends, according to the triggering of USSD service information, a PUSSDR (ProcessUnstructuredSS_Request, i.e. Process Unstructured Supplementary Service Data Request) message to the USSDC to trigger a USSD intelligence service.

Step 120, after receiving the PUSSDR message, the USSDC processes USSD character strings to obtain parameters such as an access code and so on.

Step 130, the USSDC sends an MML command to the OCS according to the function flow (such as query balance and recharge) corresponding to the access code.

Step 140, after receiving the MML command, the OCS performs internal processing, and returns processing results to the USSDC.

Step 150, the USSDC forms the processing results into corresponding USSD character strings, and sends the results to the MSC/HLR through PUSSDR_ACK (response to ProcessUnstructuredSS_Request), the MSC/HLR forwards the results to the user, and the procedures end.

In the existing method, the function path of the system is unique, viz. the corresponding function flow can be entered only through the USSD access code input by the user (for example, *780# corresponds to query balance). The method requires the user to remember the USSD access code, and moreover, if the user parameters are incomplete when entering the function flow, the traditional USSD service will report an error and end the flow. For the user, the existing method is not flexible and convenient enough.

SUMMARY OF THE INVENTION

The present invention aims at settling the technical problem by providing a method for implementing a USSD service to allow flexible and convenient use of the USSD service by a user of the OCS system, so as to make the USSD service more personalized and more user-friendly for terminal users.

In order to settle the above mentioned technical problem, the present invention provides a method for implementing an Unstructured Supplementary Service Data service, in which an access code, menu or function corresponding to the access code, and menu or function corresponding to each response under each level of menu are defined, wherein the menu includes menu content for prompting users, and the method comprises:

a user inputting an Unstructured Supplementary Service Data (USSD) character string to an Unstructured Supplementary Service Data Center (USSDC) at the system side; and the USSDC processing the USSD character string, obtaining an access code, wherein if the access code corresponds to a menu, the USSDC returns menu content of the menu to the user, the user receives the menu content, or receives the menu content and interacts, according to the menu content, with the USSDC.

The method can also be characterized in: the menu is a notification type menu or a request type menu, when the user receives the menu content, if the menu is a request type menu, the user receives the menu content and interacts, according to the menu content, with the USSDC; and if the menu is a notification type menu, the user receives the menu content.

The method can also be characterized in: when the user interacts, according to the menu content, with the USSDC, the following steps are carried out:

the user inputting response information according to the menu content, after receiving the response information, the USSDC obtaining a menu or function corresponding to the response information, wherein if the response information corresponds to a menu, the USSDC returns the menu content to the user, the user receives the menu content, or receives the menu content and interacts, according to the menu content, with the USSDC; and if the response information corresponds to a function, the corresponding function is performed.

The method can also be characterized by, after the USSDC obtains the access code, if the access code corresponds to a function, performing the corresponding function.

The method can also be characterized in that the step of performing the corresponding function further includes the following steps:

checking if the user has input complete parameters required for the function, if yes, performing the function; otherwise, sending a prompting message to the user to prompt the user to input parameters required for the function, and performing the function after the user has input the complete parameters.

The method can also be characterized in: when obtaining the complete parameters and performing the function, the USSDC sends a man-machine language command to the online charging system according to the function, upon receiving the man-machine language command, the online charging system processes the command, and returns a processing result to the USSDC, and the USSDC converts the processing result into a USSD character string and sends it to the user.

The method can also be characterized in: defining the access code, menu or function corresponding to the access code, and menu or function corresponding to each response of the menu is achieved by defining a USSD service code table, a menu information table, and a menu response table, wherein, each table entry of the USSD service code table contains an access code, a service type, and a service index, the service type specifying whether the service type corresponding to the access code is menu or function, the service index specifying menu index or function index corresponding to the access code;

each table entry of the menu information table contains a menu index, a menu type, and menu content, the menu index identifying the table entry of the menu, the menu type specifying whether the menu is a request type menu or a notification type menu, the menu content containing information for prompting the user to input response information or for notifying the user of relevant information;

each table entry of the menu response table contains a menu index, a menu response, a service type, and a service index, wherein the menu index specifies to which menu the response is, the menu response specifies of which kind the response to the menu corresponding to the menu index is, the service type specifies whether the response corresponds to a menu or a function, the service index specifies the menu index or the function index corresponding to the response.

The method can also be characterized in: the menu content comprises versions in different languages, when the menu content is sent to the user, according to a preferable language of the user, the menu content of the version in the corresponding language is sent to the user.

The present invention also provides a method for implementing an Unstructured Supplementary Service Data service, comprising:

a user inputting an Unstructured Supplementary Service Data (USSD) character string to an Unstructured Supplementary Service Data Center (USSDC) at the system side; and the USSDC processing the USSD character string, obtaining an access code, and judging whether parameters input by the user are complete, wherein if the parameters are incomplete, sends prompting information to the user to prompt the user to input parameters required for the function corresponding to the access code, and performs the function after the user inputs the complete parameters.

The method can also be characterized in: the access code, menu or function corresponding to the access code, and menu or function corresponding to each response under each level of menu are defined, the menu contains menu content for prompting users; after the USSDC processes the USSD character string and obtains the access code, whether parameters input by the user are complete is judged only if the access code corresponds to a function; if the access code corresponds to a menu, the menu content of the menu is returned to the user, and the user receives the menu content, or receives the menu content and interacts with the USSDC according to the menu content.

The present invention realizes, by using USSDR MAP messages, a method of making functions dynamically configurable and intelligently identifying the input of the user to automatically select service flow, effectively solves the problems of singleness in the mode in which the user uses the USSD service, and the function characteristics of the USSD service being not dynamically configurable, such that an OCS user can use the USSD service interactively according to system prompts, or use the USSD service using an one-step input mode, and at the same time, provides a method for the operators, which is capable of flexibly configuring and expanding the USSD service function. The present invention is advantageous in expansion and promotion of the USSD service, and enables the USSD service to be more personalized and more user-friendly to terminal users at the same time.

BRIEF DESCRIPTION OF THE ACCOMPANYING DRAWINGS

FIG. 4 is a schematic diagram of the USSD service code table, the menu information table, the menu response table according to an embodiment of the present invention;

DETAILED DESCRIPTION OF THE PREFERABLE EMBODIMENTS

Figure 1:
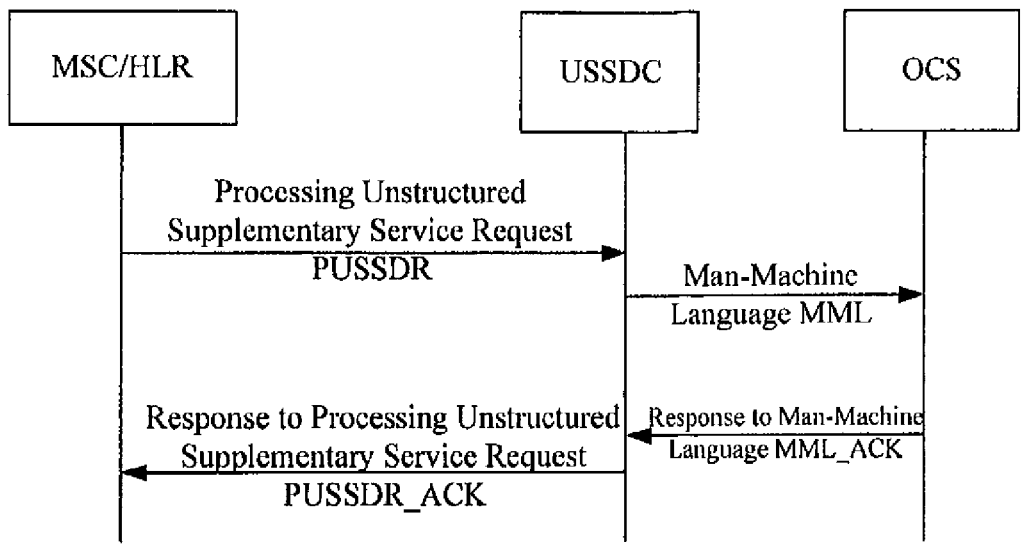
FIG. 1 is a signaling flowchart of the existing USSD service.

The main idea of the embodiments of the present invention is: an interactive menu is provided, and a user can enter the performing of the corresponding function flow according to menu prompts from the system side. In addition, the embodiments of the present invention can also prompt the user to input the parameters required upon entering the function flow, or intelligently identify the parameters input by the user, and send a prompt, when the parameters input by the user are incomplete or incorrect, to prompt the user to input correct parameters.

The embodiments of the present invention mainly uses a USSDR (Unstructured Supplementary Service Data Request) MAP (Mobile Application Part) message to realize the function of making functions dynamically configurable and intelligently identifying the input of the user to automatically select services. It is required to amend USSD service logic at the USSDC side, add a processing module of making USSD function dynamically configurable and a module for intelligently identifying the input of the user to automatically select service flow, and carry out database design. In the embodiments of the present invention, it is required to add a plurality of menus each identified uniquely by a menu index, add correspondence relation between the USSD access code and the menu index or function index, and add correspondence relation between each response and the menu index or function index after the user inputs responses according to prompts of the menu content.

The processing module of making function dynamically configurable: the operators define a number of access codes of the USSD service, menus or functions corresponding to the access codes (each access code corresponding to one menu index or one function index, referring to the USSD service code table in FIG. 4(a) for one example), menu content included in the menu corresponding to each menu index (referring to the menu information table in FIG. 4(b) for one example), and function index or submenu index corresponding to each response of the user under the menu (referring to the menu response table in FIG. 4(c) for one example of the correspondence relation between user input response information and menu index/function index). Each of the above tables can be updated and expanded conveniently, and amendments to the access codes will not affect the use of the user.

When receiving a USSD string sent by the HLR, the USSDC does not simply convert the USSD string into an MML command and send it to the OCS, but sends to the user, according to the correspondence relations configured in an embodiment of the present invention, the menu content of the menu which is configured in the database and corresponding to the access code of the USSD string, so as to prompt the user what to do next. For example, when a USSD string having a code of *780# received, a menu having a menu index of 1 is called and the menu content "press 1 for recharge, press 2 for query balance . . . " is sent to the user; after the user subsequently sends "1", the USSDC further prompts, according to the input of the user, the user to input response information or input parameters, sends the final operation to the OCS in the form of the MML, and sends a USSD message to the user after receiving results returned from the OCS. That is, the instruction which is originally supposed to be remembered by the user is decomposed, the user is prompted step by step to input all kinds of information required, and the service logic of the USSDC forms a MML command of a specific format and sends it to the OCS.

The processing of intelligently identifying the input of the user is described as follows: obtaining an access code according to the parameters input by the user, if the access code corresponds to a function, obtaining, through a USSDR message, the parameters required for the function flow, such as recharge password required in the recharge process, and transfer password, transfer amount, number of the receiving party required in the account transfer process; if the number of the parameters in the USSD string input by the user meets the requirement for the function flow, directly entering a specific function flow such as recharge; if the parameters are not sufficient, prompting the user to continue to input parameters required.

The present invention is further described with specific embodiments as follows.

Figure 2:
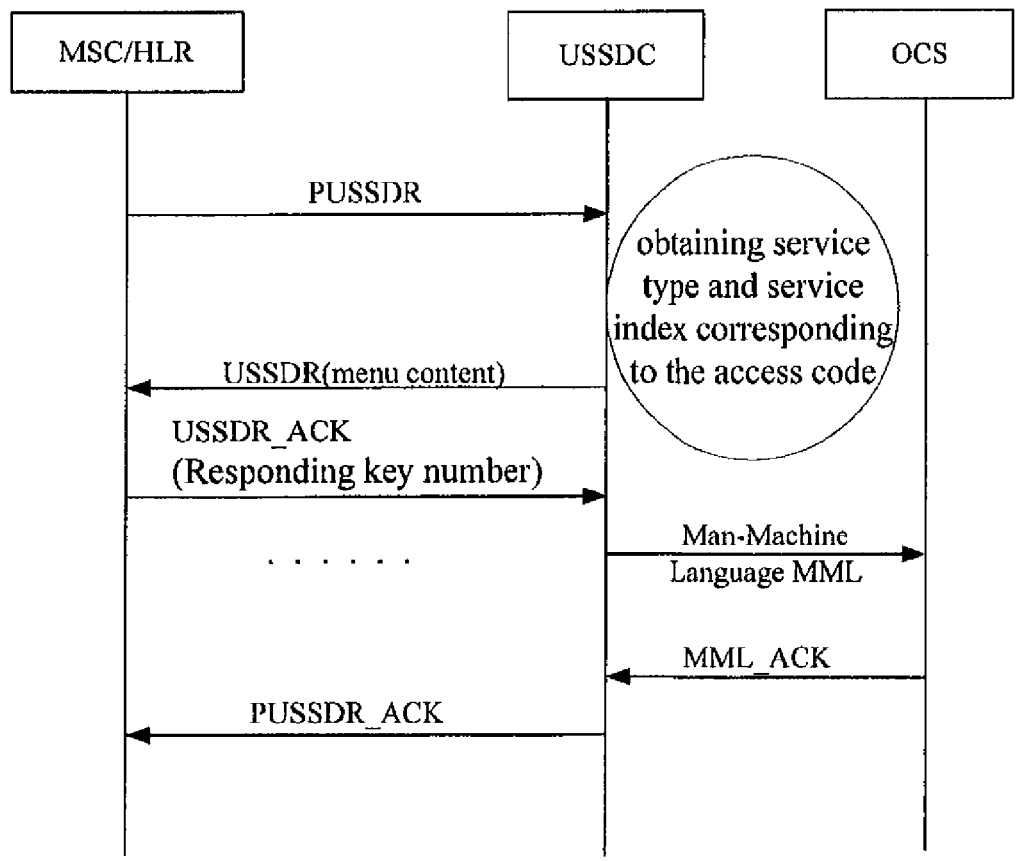
FIG. 2 is a signaling flowchart of the USSD whose functions are dynamically configurable according to an embodiment of the present invention.

FIG. 2 is a schematic diagram of entering a function flow from a menu, comprises the following steps.

Step 201, when a user dials a USSD access code and inputs a USSD string, the HLR sends, according to the triggering of USSD service information, a PUSSDR message carrying the USSD string to the USSDC, to trigger a USSD intelligent service.

Step 202, after receiving the PUSSDR message, the USSDC processes the USSD string in the message to obtain the access code and other parameters input by the user.

Figure 7:
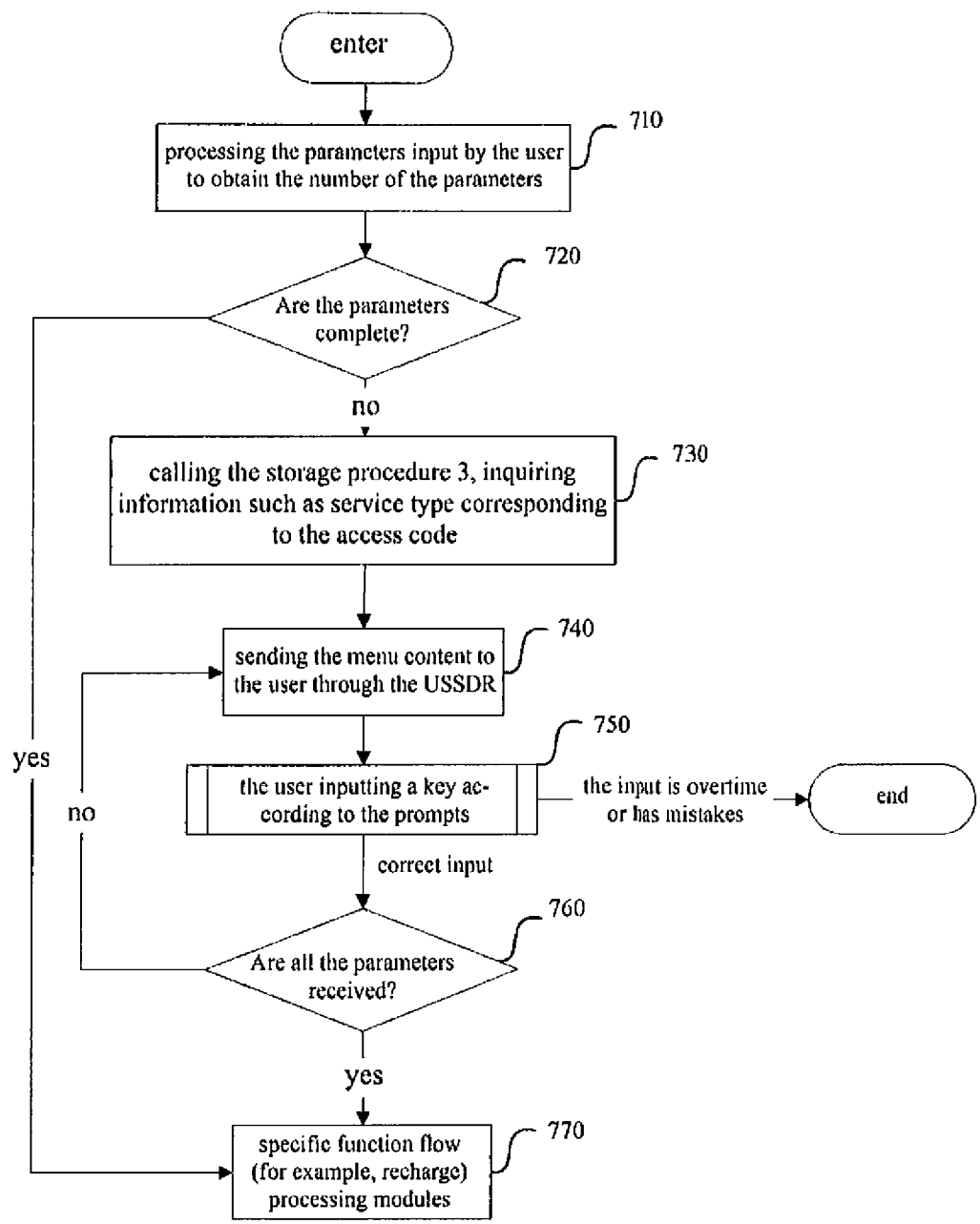
FIG. 7 is a flow chart of intelligently selecting service according to an embodiment of the present invention.

Step 203, the USSDC obtains, according to the access code, a menu index or a function index corresponding to the access code, if it is a menu index, obtains menu content corresponding to the menu index, and then, enters Step 204; if it is a function index and if the user has input parameters required for the function, performs Step 205, if it is a function index and if the user has not input parameters required by the function or the parameters input by the user are incorrect, performs steps as shown in FIG. 7.

In the above, the USSDC obtains the menu index or the function index corresponding to the access code by calling storage procedure 1, the procedure specifically includes:

obtaining service type to which the access code belongs according to user default language and the access code input by the user, and further obtaining the service index according to the service type, if the service type is menu (menu), obtaining the menu index (menuid), if the service type is function (func), obtaining the function index (funcid). For example, firstly, looking up in the USSD service code table illustrated in FIG. 4(a) according to the access code, to obtain the service type and service index, and then, looking up in the menu information table illustrated in FIG. 4(b) according to the service index, or entering the corresponding function flow.

Step 204, the USSDC sends the menu content to the user through USSDR operation, the user inputs response information according to the menu content (for example, presses the sending key according to the menu content), and sends the response information to the USSDC, the response information of the user is sent to the USSDC through USSDR_ACK, the USSDC obtains the corresponding function index or menu index according to the menu index and the response message of the user, if a function index is obtained and the user has input parameters required for the function, performs Step 205, if a function index is obtained and the user has not input parameters required for the function or the input is incorrect, performs the steps as illustrated in FIG. 7; if a menu index is obtained, obtains menu content corresponding to the menu index, and repeats Step 204.

In the above, the USSDC obtains the corresponding function index and menu index by calling storage procedure 2 according to the menu index and the response information of the user. Regarding the storage procedure 2, reference can be made to the flow in FIG. 5.

Step 205, the USSDC sends an MML command to the OCS according to the function flow (such as query balance and recharge and so on) corresponding to the function index.

Step 206, after receiving the MML command, the OCS performing internal processing, and then returning the processing result to the USSDC.

Step 207, the USSDC forms the processing result into corresponding USSD character string and sends it to the MSC/HLR through PUSSDR_ACK, the MSC/HLR forwards the character string to the user, and the flow ends.

Figure 5:
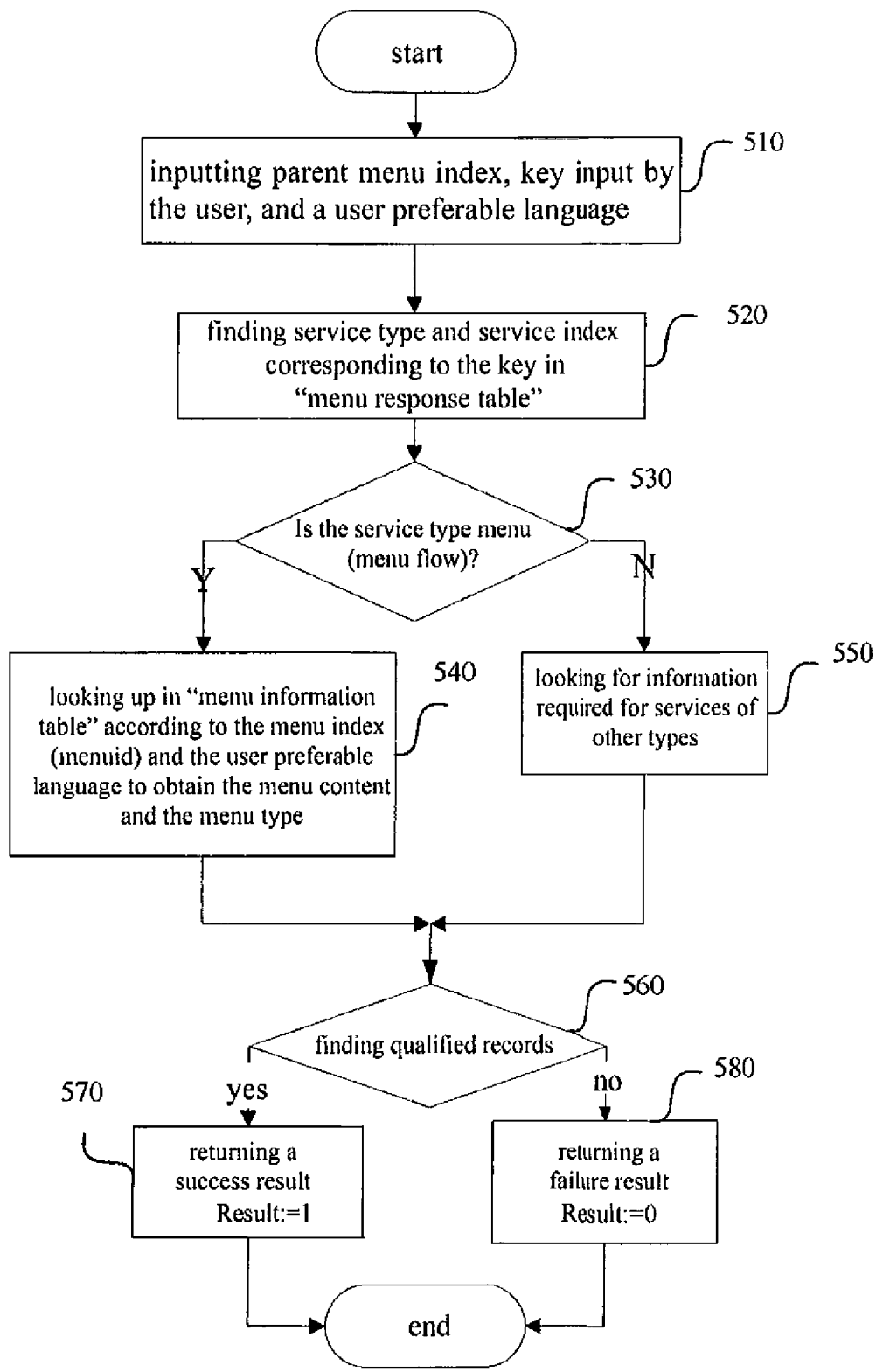
FIG. 5 is a processing flow chart of the storage procedure 2 according to an embodiment of the present invention.

The storage procedure 2 in Step 204 is as shown in FIG. 5, and is explained as follows.

Step 510, a menu index of a parent menu (viz. the menu to which the user enters before inputting response information), the response information input by the user, and a user preferable language are obtained.

Step 520, a qualified service type and a qualified service index (menu index or function index) is found in "menu information table".

Step 530, whether the service type is menu or function is judged, if it is menu, enter Step 540, if it is function, turn to Step 550.

Step 540, the menu type and the menu content is obtained by looking up in the menu information table according to the menu index and the user preferable language, and turn to Step 560.

Step 550, information required for the service is searched according to the function index, and turn to Step 560.

Step 560, whether a qualified record is found is judged, if yes, turn to Step 570, otherwise, turn to Step 580.

Step 570, a success result (the result being 1) is returned, and the flow ends.

Step 580, a failure result (the result being 0) is returned, and the flow ends.

Figure 3:
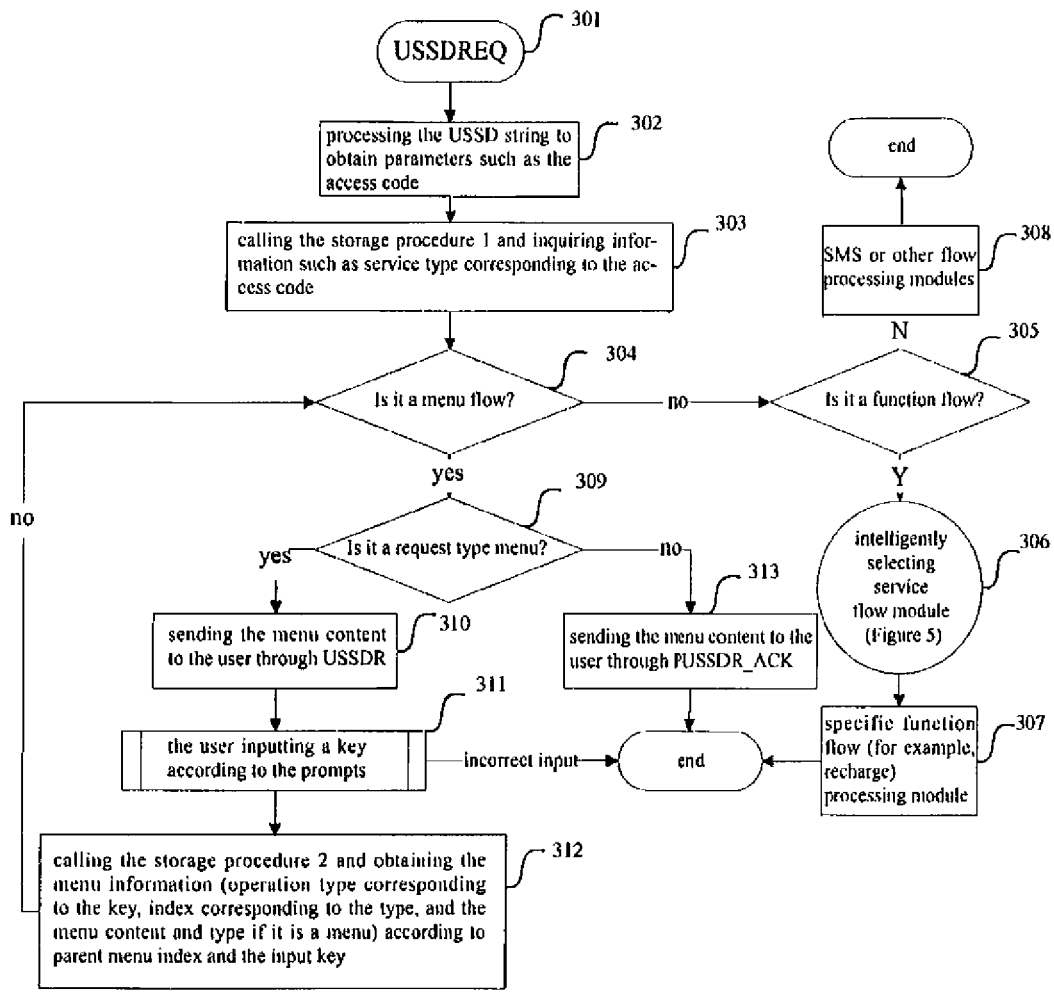
FIG. 3 is a flowchart of the USSD service whose functions are dynamically configurable and which is capable of intelligently selecting service flow according to an embodiment of the present invention.

FIG. 3 illustrates a flowchart of the USSD service whose functions are dynamically configurable and which is capable of intelligently selecting service flow, which specifically includes the follow procedure.

Step 301, when a user dials a USSD access code and inputs a USSD string, the HLR sends, according to the triggering of USSD service information, a PUSSDR message carrying the USSD string to the USSDC, to trigger a USSD intelligent service.

Step 302, after receiving the PUSSDR message, the USSDC processes the USSD string in the message to obtain parameters such as the access code and so on.

Step 303, the USSDC inquires, according to the access code, the service type (for example, type 1menu denoting menu flow, 2func denoting a specific function flow such as recharge and the like) corresponding to the access code and the service index corresponding to the service type; if the service type is menu, it inquires the menu content (local language content string, English content string) and menu type (0 request type, 1 notification type) corresponding to the menu index, wherein, the USSDC inquires the service type and so on corresponding to the access code by calling the storage procedure 1.

Step 304, the USSDC judges whether the service type is menu, if not, turn to Step 305, if yes, enter Step 309.

Step 305, whether the service type is a function flow is judged, if not, turn to Step 308, if yes, turn to Step 306.

Step 306, enter processing of intelligently selecting service flow (referring to FIG. 7 for detailed description), and after finishing the processing, turn to Step 307.

Step 307, return to the corresponding function flow, after finishing the processing, notifying the user of the result, and then end the flow.

Step 308, turn to the corresponding processing module, such as SMS or other flow processing modules, end the flow after finishing the processing.

Step 309, the menu type is judged, if it is a notification type menu, turn to Step 313, if it is a request type menu, enter Step 310.

Step 310, the menu content is sent to the user through the USSDR.

Step 311, the user inputs response information according to prompts of the menu content, if the input response information is incorrect, end the flow, otherwise, perform Step 312.

Step 312, the service type and the service index corresponding to the response information are obtained according to the parent menu index and the response information input by the user, if the service index is menu index, the menu content and the menu type corresponding to the menu index are further obtained, and turn to Step 304.

Step 313, the menu content is sent to the user through PUSSDR_ACK, the flow ends.

Thus, the USSD application whose functions are dynamically configurable and in which the service flow can be intelligently selected is realized.

FIG. 4 illustrates the information configured in an embodiment of the present invention, and the corresponding information can be obtained by looking up in the following tables.

(a) the USSD service code table

It includes three items of contents, viz, access code (sercode), service type (sertype) corresponding to the access code, and service index (serid) corresponding to the service type, wherein, sercode is a unique index, identifying the USSD access code configured in the HLR;

sertype is the service type, viz. whether sercode corresponds to a menu or a function, for example, sercode being 1 denotes that sercode corresponds to menu (menu), sercode being 2 denotes that sercode corresponds to function (func);

serid denotes the index corresponding to the service, if the service is menu, the service corresponds to menu index (menuid), if the service is function, the service corresponds to function index (funcid).

For example, "781" denotes the flow of querying balance, and in the USSD service code table, sercode is 781, and the value of sertype (service type) is 2, which denotes function flow, and serid (function index) is 2, which denotes query balance.

The configuration items in the USSD service code table can be dynamically added, deleted, or amended.

(b) the menu information table

The configuration items for each menu have the following attributes: menu index (menuid), menu type (menumode), menu content (content, for example, English content string content1, local language content string content2), and content description (description), wherein, menuid is a unique index, which uniquely identifies a menu.

The menumode denotes whether the menu type is a request type or a notification type, and the value thereof can be 0 or 1, wherein, 0 denotes that the menu is a request type menu, and can receive the response of the user; 1 denotes that the menu is a notification type menu, and the content of the menu is sent to the user directly without any need for the response of the user. The menu type can be denoted using other characters, character strings or numerals, and this is not limited in the present invention.

The menu content (content) is the specific content included in the menu, and is used to prompt a user. Usually, the menu content is sent to the user, and the user inputs response information according to the menu content or only receives the menu content without any need for inputting response information. Generally, the menu content includes English content string content1 and local language content string content2, for example, the English content string is: "product info press 1. query balance press 2", and the local language content string is: "产品信息请按 1, 产品信息请按 2".

The configuration items in the menu information table can be dynamically added, deleted, or amended, for example, menu 2 can be deleted, the content and the menu type of menu 2 can be amended, and new menus 3 and 4 can also be added.

After determining that the service type is menu, the steps of obtaining the menu index, inquiring in the menu information table according to the menu index, and sending the menu content to the user are performed.

(c) the menu response table

It includes menu index (menuid), key (keynum), service type (sertype) and service index (serid), wherein (menuid, keynum) is an index possessing uniqueness, through menuid and the response keynum input by a user, the subsequent service type (1menu, 2func) and index (such as menuid, funcid) corresponding to the service type can be uniquely determined.

For example, in FIG. 4(b), when (menuid, keynum) is (1, 1), the corresponding service type is menu, and the corresponding menu index is 2, viz. when the menu index is 1 and the user inputs 1, the corresponding menu index is 2, and the system sends the menu content of the menu 2 to the user; when (menuid, keynum) is (1, 2), the corresponding service type is function, and the corresponding function index is 2.

If the service index is a menu index, information such as menu content and menu type corresponding to the menu index can be obtained by further looking up in the menu information table. If the service index is a function index, the corresponding function flow is performed.

The configuration items in the table can be dynamically added, deleted, or amended.

The system further includes a message content table (message_context) for storing prompt content strings corresponding to each function.

The tables mentioned above are just one exemplary embodiment of the configuration in the present invention, the present invention is not limited to the form of using the above tables, and configuration in other manners can also be used as long as the above contents are included.

In addition, an access code can be configured in the USSD service code table, the access code corresponds to a menu index, and the menu corresponding to the menu index and a number of submenus of the menu include all the functions of the system. The user can obtain the menu content only by inputting the access code, select the needed function according to the menu content, and continue to perform a submenu, until finally accomplish the function under the prompts of the system step by step. Thus, the user does not need to remember access codes of all the functions and the input formats of parameters under the functions, which facilitates the use of the user. In addition, the system allows convenient addition, deletion, and change of function options in the menu, which does not change the using habits of the user.

FIG. 4 illustrates how to realize dynamic configuration of function attribute items. The function attribute items include: the level of a menu in which the function lies, the parent menu to which the function corresponds, the key corresponding to the function, and whether the function has dynamic configuration. These attributes can be configured via the USSD service code table, the menu information table, and the menu response table. For example, the level of the menu in which the function lies can be configured via the USSD service code table as to whether to enter directly or through the menu, if sertype is 2, viz. func, entering the function flow directly, if sertype is 1, viz. menu, entering the flow through the selection of the menu by the user. Entering the flow through a menu needs the cooperation of the next two tables, the parent menu corresponding to the function, and the response corresponding to the function are configured through the menu response table.

Figure 6:
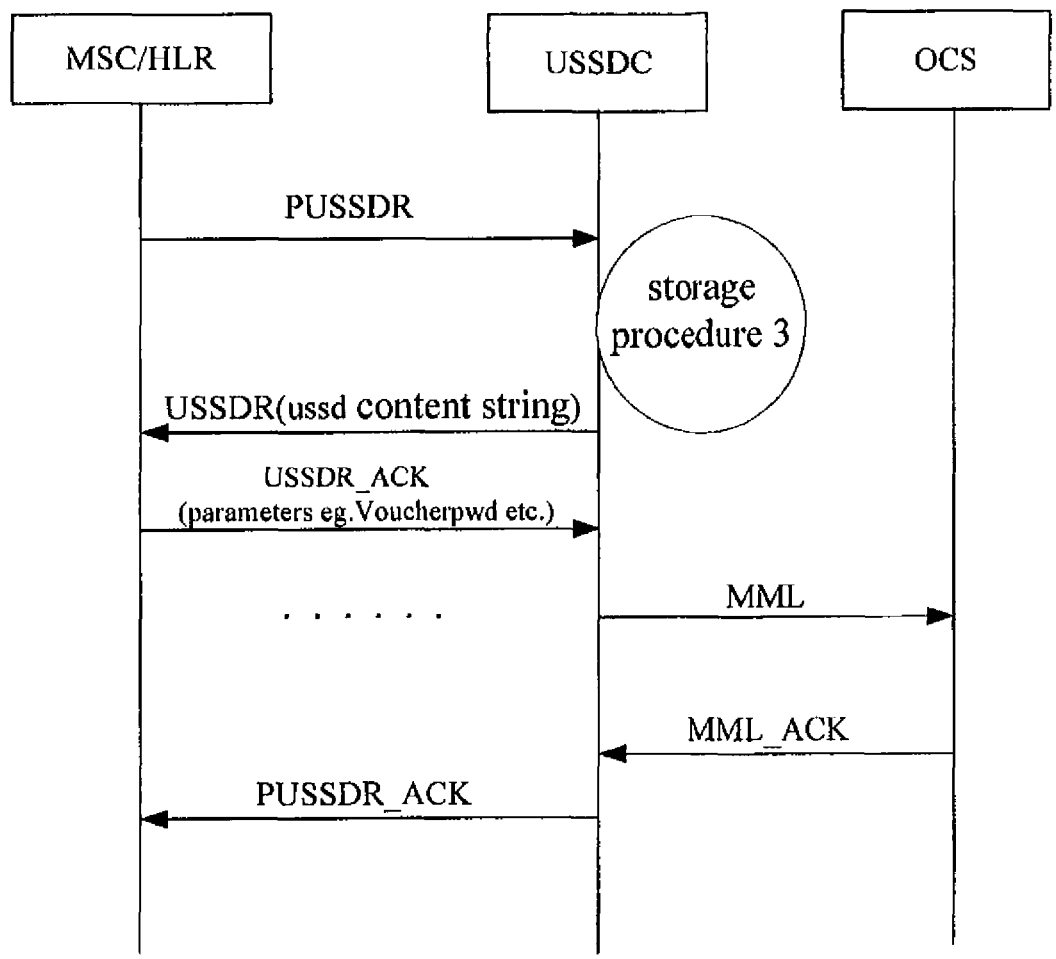
FIG. 6 is a signaling flowchart of the USSD which is capable of intelligently selecting service flow according to an embodiment of the present invention.

FIG. 6 illustrates the case of entering the flow by obtaining the parameters in an interactive manner, and this is used in the case the USSD string corresponds to a function flow, and parameters input by a user cannot meet the requirements for the function flow.

Step 610, when a user dials a USSD access code, the HLR sends, according to the triggering of USSD service information, a PUSSDR message to the USSDC, to trigger a USSD intelligent service.

Step 620, after receiving the PUSSDR message, the USSDC processes the USSD string to obtain parameters such as the access code and so on.

Step 630, the USSDC calls a storage procedure 3 according to the function index corresponding to the access code to obtain the corresponding content string, and prompts the user about the parameters that is supposed to be input.

Step 640, the USSDC sends the content string to the user through USSDR operation, the user may input required parameters according to the prompt of the content string, the parameters input by the user are sent to the USSDC through USSDR_ACK, the USSDC judges whether the parameters are completely received, if yes, enter Step 650 directly, if not, repeat Step 640.

In the above, when the content string is sent to the user, one or more content strings may be sent at one time to prompt the user about all the parameters that is supposed to be input; or one content string may be sent each time, then one parameter is input, and after the user inputs the parameter, the next content string is sent to prompt the user to input the next parameter, until the user has input all the parameters.

Step 650, the USSDC sends an MML, command to the OCS according to the function flow (such as query balance and recharge and so on) selected by the user.

Step 660, after receiving the MML command, the OCS performs internal processing, and then returns the result to the USSDC.

Step 670, the USSDC forms the processing result into corresponding character string and sends it to the user through PUSSDR_ACK, the flow ends.

In the above, the storage procedure 3 in Step 630 specifically includes:

inquiring, according to the function index, the user default language or user preferable language, in the message content table to obtain content string 1, content string 2, . . . , content string n which need to be prompted to the user under the function.

The above Steps 630-670 are also applicable in the system prompting the user to input parameters when the user enters the function flow from the menu.

FIG. 7 illustrates the steps of entering the processing flow of intelligently identifying the input of the user and automatically selecting service flow after the flow is judged to be a function flow, specifically include the following procedure.

Step 710, the number of parameters carried in the USSD string is analyzed.

Step 720, whether the parameters are complete is judged according to the specific function flow, if yes, turn to Step 770, if not, turn to Step 730.

Step 730, the storage procedure 3 is called, the USSD content string group (viz. prompt content string group) which is needed by the function flow corresponding to the function index for interaction is inquired in the message content table.

Step 740, the USSD content string is sent to the user through the USSDR.

Step 750, the user inputs parameters according to the prompts of the USSD content string; if the input has mistakes or is overtime, return "incorrect input" to the user, end the flow, and if the input is correct, perform Step 760.

Step 760, whether all the parameters have been obtained is judged, if yes, turn to Step 770, and if not, turn to Step 740.

Step 770, enter specific function flow (such as recharge) processing modules, then end the flow.

By using the USSD flow of interactively obtaining parameters provided in the present invention, it would be very convenient to dynamically configure the service flow, as long as the USSD service code table, the menu information table, and the menu response table are properly configured. The user may interactively use the USSD service according to the system prompt, or use the USSD service function (such as recharge and query balance and so on) by using an one-step input.

By using the method of the present invention, the functions are dynamically configurable (directly entering or entering through a menu, and when entering through a menu, entering from which level of menu is configurable) and the input of the user can be intelligently identified to enter the corresponding service flow (whether it is necessary to prompt the user to continue to input parameters), the user may use the USSD service very conveniently according to his own habits, meanwhile, it is very convenient for an operator to configure and expand the USSD service.

INDUSTRIAL APPLICABILITY

The present invention realizes, by using USSDR MAP messages, a method of making functions dynamically configurable and intelligently identifying the input of the user to automatically select service flow, effectively solves the problems of singleness in the mode in which the user uses the USSD service, and the function characteristics of the USSD service being not dynamically configurable, such that an OCS user can use the USSD service interactively according to system prompts, or use the USSD service using an one-step input mode, and at the same time, provides a method for the operators, which is capable of flexibly configuring and expanding the USSD service function. The present invention is advantageous in expansion and promotion of the USSD service, and enables the USSD service to be more personalized and more user-friendly to terminal users at the same time.

What is claimed is:

1. A method for implementing an Unstructured Supplementary Service Data service, comprising:
    defining an access code, defining a menu or a function corresponding to the defined access code, and defining a menu or function corresponding to a response to the menu, which is corresponding to the defined access code;
    an Unstructured Supplementary Service Data Center (USSDC) at a system side receiving an Unstructured Supplementary Service Data (USSD) string inputted by a user; and
    the USSDC processing the USSD character string, obtaining an access code of a service corresponding to the USSD string from the defined access code, and performing, according to a first service type corresponding to the access code, an operation corresponding to the first service type;
    wherein the first service type is the function or the menu;
    wherein the step of defining the access code, defining the menu or the function corresponding to the access code, and the menu or the function corresponding to the response to the menu which is corresponding to the access code is achieved by defining the USSD service code table, the menu information table, and the menu response table, wherein, each table entry of the USSD service code table comprises an access code, a first service type, a first service index, a first menu index and a first function index, wherein the first service type specifies whether the service type corresponding to the access code is menu or function, the first service index specifies the first menu index or the first function index corresponding to the access code; each table entry of the menu information table comprises a first menu index, a menu type, and menu content, wherein the first menu index indentifies the table entry, the menu type specifies whether the menu is a request type menu or a notification type menu, the menu content comprises information for prompting the user to input response information or for notifying the user of relevant information; each table entry of the menu response table comprises a second menu index, a second function index, a menu response, a second service type and a second service index, wherein the second menu index specifies to which menu the response is, the menu response specifies of which kind the response to the menu which is corresponding to the second menu index is, the second service type specifies whether the response corresponds to a menu or a function, the second service index specifies the second menu index or the second function index corresponding to the response.

2. A The method according to claim 1, wherein,
    the step of performing an operation corresponding to the first service type is: performing the function corresponding to the access code.

3. A The method according to claim 2, wherein,
    the USSD string comprises parameters required for performing the function;
    the step of performing a function corresponding to the access code comprises:
    the USSDC checking whether the parameters are complete, if yes, performing the function; otherwise, sending a prompting message to the user to prompt the user to input complete parameters required for the function, and performing the function after the user has input the complete parameters.

4. The method according to claim 3, wherein, the step of the USSDC performing the function after the user has input the complete parameters comprises: the USSDC sending a man-machine language command to an online charging system according to the function, upon receiving the man-machine language command, the online charging system processing the man-machine language command, and returning a processing result to the USSDC, and the USSDC converting the processing result into a USSD string and sending the converted USSD string to the user.

5. A The method according to claim 1, wherein,
    the step of performing an operation corresponding to the first service type is: returning menu content of the menu to the user.

6. A The method according to claim 5, wherein,
    the menu is a notification type menu or a request type menu;
    if the menu is the request type menu, the method further comprises, after the step of returning menu content of the menu to the user: the user receiving the menu content, and interacting with the USSDC according to the menu content;
    if the menu is a notification type menu, the method further comprises, after the step of returning menu content of the menu to the user, a step of: the user receiving the menu content.

7. A The method according to claim 6, wherein, the step of the user interacting with the USSDC according to the menu content comprises:
    the user inputting response information according to the menu content, and upon receiving the response information, the USSDC performing, according to a second service type corresponding to the response information, an operation corresponding to the second service type.

8. A The method according to claim 7, wherein,
    the second service type is menu;
    the step of performing an operation corresponding to the second service type is: the USSDC returning menu content of the menu corresponding to the response information to the user.

9. A The method according to claim 8, wherein,
    the menu of the second service type is a notification type menu or a request type menu;

if the menu of the second service type is the request type menu, the method further comprises, after the step of the USSDC returning menu content of the menu corresponding to the response information to the user: the user receiving the menu content of the menu corresponding to the response information, and interacting with the USSDC according to the menu content of the menu corresponding to the response information;

if the menu of the second service type is the notification type menu, the method further comprises, after the step of the USSDC returning menu content of the menu corresponding to the response information to the user, the step of: the user receiving the menu content of the menu corresponding to the response information.

10. A The method according to claim 7, wherein, the second service type is function;

the step of performing an operation corresponding to the second service type is: performing a function corresponding to the response information.

11. A The method according to claim 10, wherein, the response information comprises parameters required for performing the function;

the step of performing a function corresponding to the response information comprises:

the USSDC checking whether the parameters are complete, if yes, performing the function; otherwise, sending a prompting message to the user to prompt the user to input complete parameters required for the function, and performing the function after the user has input the complete parameters.

12. The method according to claim 11, wherein, the step of the USSDC performing the function after the user has input the complete parameters comprises: the USSDC sending a man-machine language command to an online charging system according to the function, upon receiving the man-machine language command, the online charging system processing the man-machine language command, and returning a processing result to the USSDC, and the USSDC converting the processing result into a USSD string and sending the converted USSD string to the user.

13. The method according to claim 1, wherein, the menu content comprises versions in different languages, when the menu content is sent to the user, according to a preferable language of the user, the menu content of the version in the corresponding language is sent to the user.

14. A method for implementing an Unstructured Supplementary Service Data service, comprising:

a user inputting an Unstructured Supplementary Service Data (USSD) string to an Unstructured Supplementary Service Data Center (USSDC) at a system side; and the USSDC processing the USSD string, obtaining an access code, and performing, according to a service type corresponding to the access code, an operation corresponding to the service type;

wherein the method further comprises: defining an access code, menu or function corresponding to the access code, and menu or function corresponding to a response to the menu which is corresponding to the access code;

wherein defining the access code, defining the menu or the function corresponding to the access code, and the menu or the function corresponding to the response to the menu which is corresponding to the access code is achieved by defining the USSD service code table, the menu information table, and the menu response table, wherein, each table entry of the USSD service code table comprises an access code, a first service type, a first service index, a first menu index and a first function index, wherein the first service type specifies whether the service type corresponding to the access code is menu or function, the first service index specifies the first menu index or the first function index corresponding to the access code; each table entry of the menu information table comprises a first menu index, a menu type, and menu content, wherein the first menu index identifies the table entry, the menu type specifies whether the menu is a request type menu or a notification type menu, the menu content comprises information for prompting the user to input response information or for notifying the user of relevant information; each table entry of the menu response table comprises a second menu index, a second function index, a menu response, a second service type and a second service index, wherein the second menu index specifies to which menu the response is, the menu response specifies of which kind the response to the menu which is corresponding to the second menu index is, the second service type specifies whether the response corresponds to a menu or a function, the second service index specifies the second menu index or the second function index corresponding to the response.

15. A The method according to claim 14, wherein, the method further comprises:

the menu comprising menu content for prompting users;

if the service type is function, the USSD string comprising parameters required for performing the function;

the step of performing an operation corresponding to the service type comprising: judging whether the parameters are complete, if yes, performing the function; if not, sending a prompting information to the user to prompt the user to input complete parameters required for the function corresponding to the access code, and performing the function after the user has input the complete parameters;

if the service type is menu, the step of performing an operation corresponding to the service type comprising: returning the menu content of the menu to the user, the user receiving the menu content, or receiving the menu content and interacting with the USSDC according to the menu content.

* * * * *